United States Patent
Lee

(10) Patent No.: US 8,573,827 B2
(45) Date of Patent: Nov. 5, 2013

(54) BACKLIGHT MODULE

(75) Inventor: Keng-Yi Lee, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 72 days.

(21) Appl. No.: 13/450,841

(22) Filed: Apr. 19, 2012

(65) Prior Publication Data

US 2013/0128614 A1    May 23, 2013

(30) Foreign Application Priority Data

Nov. 18, 2011   (TW) ................................. 100142364

(51) Int. Cl.
F21V 7/04      (2006.01)

(52) U.S. Cl.
USPC .......................... 362/621; 362/97.1; 362/609

(58) Field of Classification Search
USPC ............... 362/609, 608, 621, 628, 97.1, 97.2, 362/97.3; 977/902; 40/546
See application file for complete search history.

(56) References Cited

U.S. PATENT DOCUMENTS

| | | | | |
|---|---|---|---|---|
| 7,360,937 B2 * | 4/2008 | Han et al. | | 362/608 |
| 7,448,786 B2 * | 11/2008 | Yue | | 362/618 |
| 7,708,442 B2 * | 5/2010 | Ableitner | | 362/611 |
| 7,963,687 B2 * | 6/2011 | Parker | | 362/607 |
| 8,419,261 B2 * | 4/2013 | Tsai | | 362/621 |
| 2007/0008739 A1 * | 1/2007 | Kim et al. | | 362/612 |
| 2008/0062352 A1 * | 3/2008 | Han et al. | | 349/65 |
| 2011/0032450 A1 * | 2/2011 | Shigeta et al. | | 349/61 |

FOREIGN PATENT DOCUMENTS

| | | |
|---|---|---|
| CN | 1512242 A | 7/2004 |
| TW | I259888 | 8/2006 |
| TW | M307134 | 3/2007 |

* cited by examiner

Primary Examiner — Mariceli Santiago
Assistant Examiner — Glenn Zimmerman
(74) Attorney, Agent, or Firm — WPAT, PC; Justin King

(57) ABSTRACT

A backlight module includes a light guide plate, a wavelength converter, and a light emitter. The light guide plate includes a main body, a first extension portion, and a second extension portion. The first extension portion is connected to the main body. The second extension portion is connected to the first extension portion. The wavelength converter is disposed at a side of the main body. The wavelength converter has an incident surface. The incident surface faces away from the main body. The first extension portion abuts against a sidewall of the wavelength converter. The second extension portion abuts against the incident surface. The light emitter is disposed at a side of the light guide plate.

14 Claims, 5 Drawing Sheets

BACKLIGHT MODULE

RELATED APPLICATIONS

This application claims priority to Taiwan Application Serial Number 100142364, filed Nov. 18, 2011, which is herein incorporated by reference.

BACKGROUND

1. Field of Invention

The present invention relates to a backlight module.

2. Description of Related Art

In recent years, owing to the rapid development of the electronics and information industries, products developed by these industries are becoming increasingly sophisticated. For current personal computers, in addition to efforts to realize faster and more powerful computing units and to offer a wide range of peripheral equipment to meet user needs, a key area of development in the computer industry relates to realizing a more compact size, lighter weight, and thinner profile for personal computers.

Liquid crystal displays have the advantages of high definition, small size, lightweight, low driving voltage, and low power consumption. Moreover, liquid crystal displays can be used in a wide range of applications, such as in portable televisions, mobile phones, camcorders, notebook computers, desktop monitors, and other consumer electronics products, and as a result, have become the most commonly used display configuration.

In addition, quantum dot displays are a popular and rapidly developing light-emitting technology. The principals of operation of the quantum dot display are different from those of liquid crystal displays and earlier cathode ray tube displays. Quantum dots are tiny nanocrystals and can be stimulated by electricity or light to emit different colors of light depending on the structure or size thereof. The larger the size of a quantum dot, the more is its tendency to emit blue light when stimulated, whereas the smaller the size of a quantum dot, the more is its tendency to emit red light when stimulated. Compared with the liquid crystal display and the cathode ray tube display, the quantum dot display can generate light with a higher efficiency, so as to save energy.

However, a traditional mounting method of a glass capillary for packaging nanocrystals of the quantum dot display involves adhering the glass capillary between a side of a light guide plate and a base of a light emitter of the quantum dot display using a LOCA (Liquid Optical Clear Adhesive). Because the LOCA is a liquid and therefore has a certain degree of fluidity, overflowing of the LOCA may occur to thereby adversely affect the optical performance and assembly of the quantum dot display.

SUMMARY

In order to solve the problems of the prior art, the invention provides an improved backlight module, in which a first extension portion and a second extension portion that are particularly designed are formed on a sidewall of a light guide plate. A wavelength converter of the backlight module can abut against the first extension portion and the second extension portion of the light guide plate and thus is limited in movement in directions parallel to the light guide plate. Therefore, a light emitter and the wavelength converter of the backlight module can be connected to each other without the use of an adhesive (e.g., a LOCA) to thereby solve the problem of overflowing of the adhesive. In addition, when the wavelength converter is adhered to a main body of the light guide plate, a LOCA is applied between the wavelength converter and the first extension portion and simultaneously between the wavelength converter and the second extension portion, so as to further enhance the mounting strength between the wavelength converter and the light guide plate. Furthermore, not only can the second extension portion of the light guide plate limit movement of the wavelength converter, but spaces between the wavelength converter and each of the main body and the second extension portions of the light guide plate can accommodate the LOCA for adhering the wavelength converter and the main body, so as to prevent the LOCA from overflowing onto the upper surface and the lower surface of the light guide plate.

According to an embodiment of the invention, a backlight module includes a light guide plate, a wavelength converter, and a light emitter. The light guide plate includes a main body, a first extension portion, and a second extension portion. The first extension portion is connected to the main body. The second extension portion is connected to the first extension portion. The wavelength converter is disposed at a side of the main body. The wavelength converter has an incident surface facing away from the main body. The first extension portion abuts against a sidewall of the wavelength converter. The second extension portion abuts against the incident surface. The light emitter is disposed at a side of the light guide plate.

In an embodiment of the invention, the first extension portion is substantially perpendicular to a sidewall of the main body, so as to limit movement of the wavelength converter along a first direction parallel to the sidewall of the main body. The second extension portion is substantially parallel to the sidewall of the main body, so as to limit movement of the wavelength converter along a second direction perpendicular to the sidewall of the main body.

In an embodiment of the invention, the backlight module further includes a reflector. The reflector is disposed under the light guide plate and is used for limiting movement of the wavelength converter along a third direction perpendicular to the reflector.

In an embodiment of the invention, the backlight module further includes an adhesive applied between the main body and the wavelength converter.

In an embodiment of the invention, the light emitter abuts against the incident surface.

In an embodiment of the invention, the light emitter is aligned with the second extension portion along a first direction parallel to the sidewall of the main body.

In an embodiment of the invention, the backlight module further includes a circuit board. The light emitter is disposed on the circuit board, and the second extension portion and the circuit board are connected to each other.

In an embodiment of the invention, the second extension portion extends between the light emitter and the wavelength converter, and the light emitter and the second extension portion are connected to each other.

In an embodiment of the invention, the light emitter is not aligned with the second extension portion along a first direction parallel to the sidewall of the main body.

In an embodiment of the invention, the main body, a pair of the first extension portions, and the second extension portion form a circular inner wall, and the wavelength converter is located within the circular inner wall.

In an embodiment of the invention, the backlight module further includes an adhesive applied between the wavelength converter and the circular inner wall.

In an embodiment of the invention, the first extension portion and the second extension portion that are connected to each other substantially form an L-shaped configuration.

In an embodiment of the invention, the first extension portion and the second extension portion are located at a corner of the main body.

In an embodiment of the invention, a wavelength converting material is packaged in the wavelength converter, and the wavelength converting material has nanocrystals included therein.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
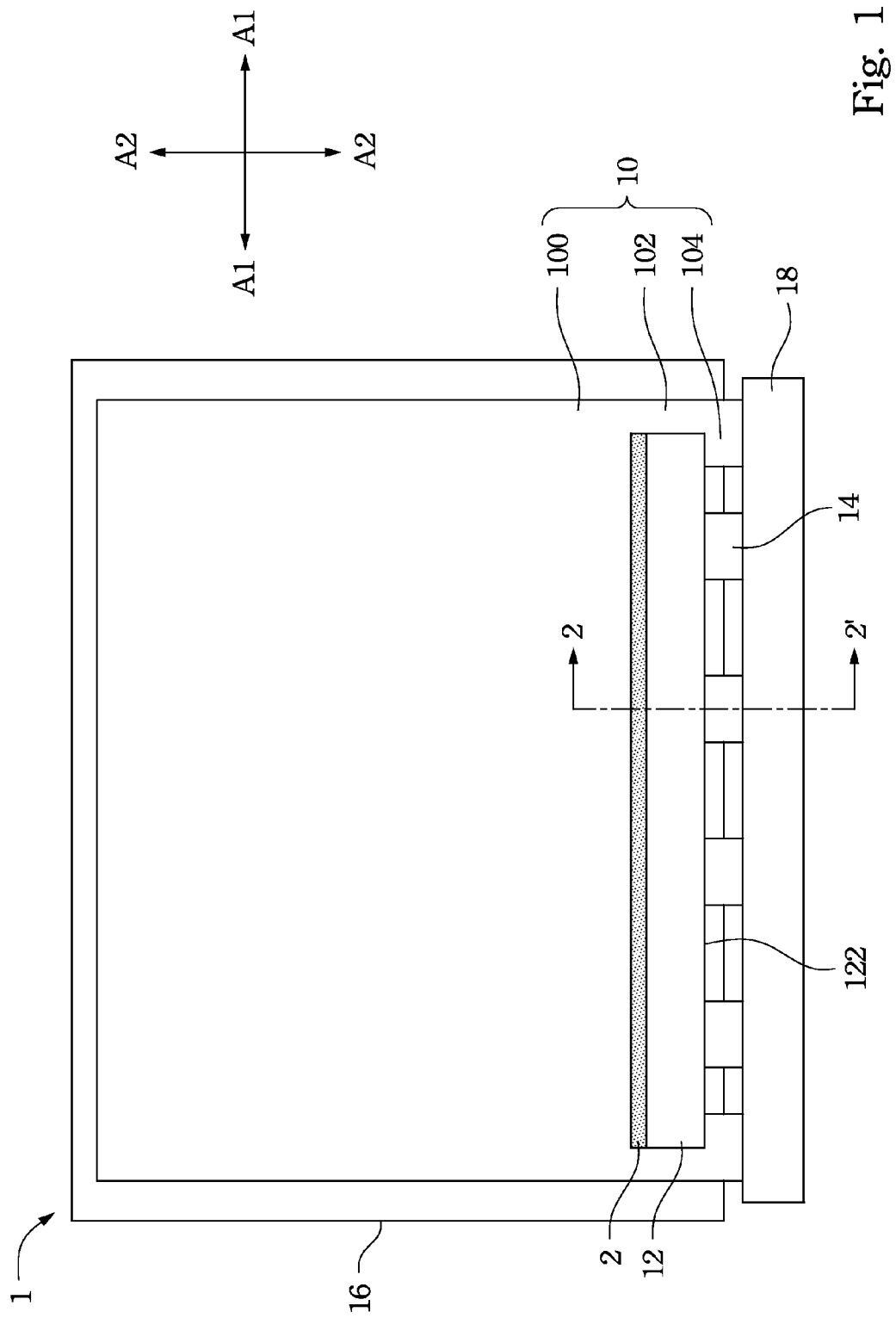
FIG. 1 is a top view of a backlight module according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

An improved backlight module is provided. Specifically, a first extension portion and a second extension portion that are particularly designed are formed on a sidewall of a light guide plate of the backlight module. A wavelength converter of the backlight module can abut against the first extension portion and the second extension portion of the light guide plate and thus is limited in movement in directions parallel to the light guide plate. Therefore, a light emitter and the wavelength converter of the backlight module can be connected to each other without the use of an adhesive (e.g., a LOCA) to thereby solve the problem of overflowing of the adhesive. In addition, when the wavelength converter is adhered to a main body of the light guide plate, a LOCA is applied between the wavelength converter and the first extension portion and simultaneously between the wavelength converter and the second extension portion, so as to further enhance the mounting strength between the wavelength converter and the light guide plate. Furthermore, not only can the second extension portion of the light guide plate limit movement of the wavelength converter, but spaces between the wavelength converter and each of the main body and the second extension portions of the light guide plate can accommodate the LOCA for adhering the wavelength converter and the main body, so as to prevent the LOCA from overflowing onto the upper surface and the lower surface of the light guide plate.

Figure 2:
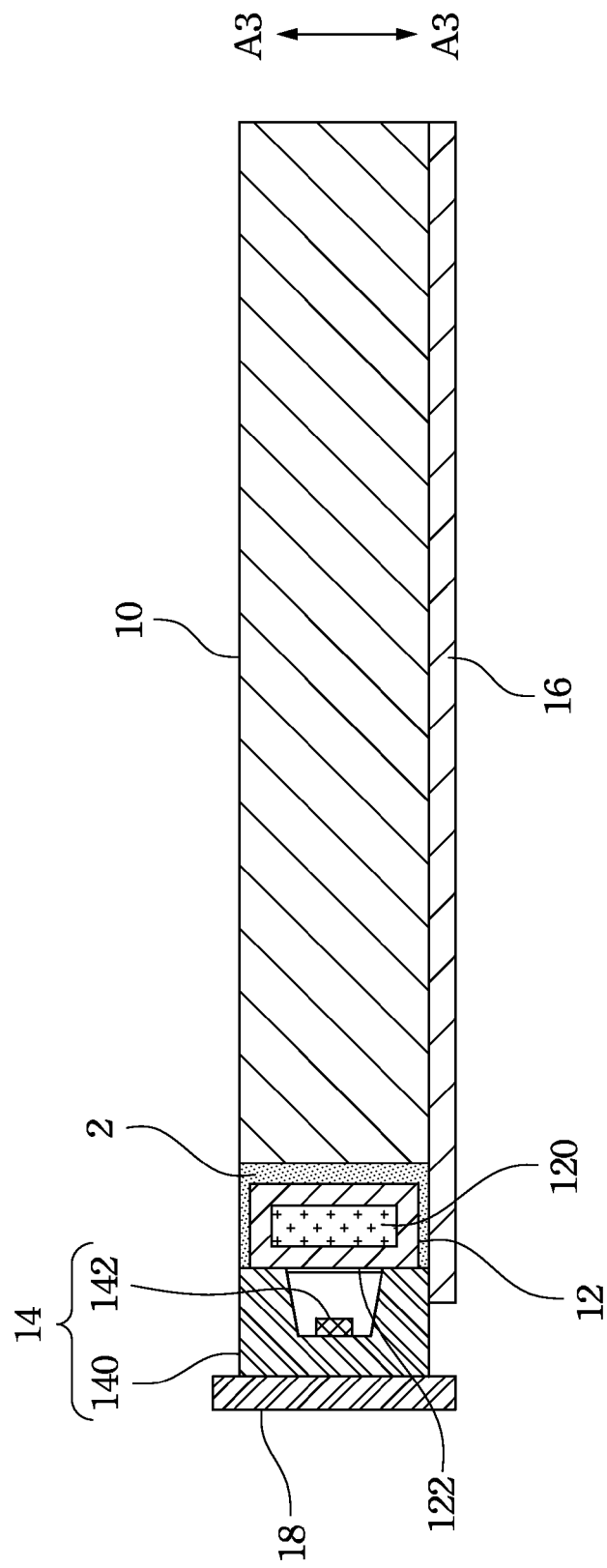
FIG. 2 is a sectional view of the backlight module in FIG. 1 taken along line 2-2'.

FIG. 1 is a top view of a backlight module 1 according to an embodiment of the invention. FIG. 2 is a sectional view of the backlight module 1 in FIG. 1 taken along line 2-2'.

The electronic apparatus that applies the backlight module 1 of the invention can be a portable computer device (e.g., a notebook computer, a tablet computer, etc.) or a portable electronic product (e.g., a PDA, a mobile phone, a game console, etc.), but the invention is not limited in this regard. That is, the electronic apparatus that applies the backlight module 1 of the invention can be any electronic product that has a display function. As long as there is a requirement to prevent an adhesive from overflowing and thereby adversely affect the optical performance and the assembly of the backlight module 1, the concepts of the invention can be applied to design the backlight module 1.

As shown in FIG. 1 and FIG. 2, the backlight module 1 includes a light guide plate 10, a wavelength converter 12, light emitters 14, a reflector 16, and a circuit board 18. The light guide plate 10 of the backlight module 1 includes a main body 100, a pair of first extension portions 102, and a pair of second extension portions 104. The first extension portions 102 of the light guide plate 10 are connected to the main body 100. The second extension portions 104 of the light guide plate 10 are connected to the first extension portions 102 respectively. In the embodiment, each pair of one of the first extension portions 102 and the corresponding second extension portion 104 of the light guide plate 10 that are connected to each other form a substantially L-shaped configuration, but the invention is not limited in this regard. The wavelength converter 12 of the backlight module 1 is disposed at a side of the main body 100 of the light guide plate 10 and can be adhered to the main body 100 and the reflector 16 by an adhesive 2. The wavelength converter 12 of the backlight module 1 has an incident surface 122. The incident surface 122 of the wavelength converter 12 faces away from the main body 100 of the light guide plate 10. The first extension portions 102 of the light guide plate 10 abut respectively against sidewalls of the wavelength converter 12. The second extension portions 104 of the light guide plate 10 abut against the incident surface 122 of the wavelength converter 12. The light emitters 14 of the backlight module 1 are disposed at a side of the light guide plate 10. The light emitters 14 of the backlight module 1 are disposed on the circuit board 18 and are electrically connected to the circuit board 18. In addition, the light emitters 14 of the backlight module 1 abut against the incident surface 122 of the wavelength converter 12. Furthermore, the circuit board 18 and the second extension portions 104 of the light guide plate 10 of the backlight module 1 can be connected to each other through an engaging, adhering, screw-fastening, or other similar mechanism. As shown in FIG. 1, the embodiment uses four light emitters 14, but the invention is not limited in this regard, and the number of the light emitters 14 can be adjusted as needed. In an embodiment, the adhesive 2 can be a LOCA, but the invention is not limited in this regard.

As shown in FIG. 2, each of the light emitters 14 includes a base 140 and a light source 142 disposed on the base 140. Each of the light sources 142 substantially faces the incident surface 122 of the wavelength converter 12. Each of the bases 140 of the light emitters 14 of the backlight module 1 abuts against the incident surface 122 of the wavelength converter 12. In an embodiment, in order to enhance the mounting strength between the wavelength converter 12 and each of the light emitters 14, each of the bases 140 of the light emitters 14 can be mounted to the wavelength converter 12 by an engaging, adhering, or other similar mechanism.

A wavelength converting material is packaged in the wavelength converter 12, and the wavelength converting material has nanocrystals 120 included therein. In some embodiments, the nanocrystals 140 packaged in the wavelength converter 14 can be stimulated to emit red light and green light, and the light sources 142 of the light emitters 14 can emit blue light. Because blue light has a high level of energy, the nanocrystals 120 can be stimulated to emit red light and green light when the blue light enters the wavelength converter 12, so as to mix to form white light which is subsequently emitted out of an exit surface of the wavelength converter 12. However, the invention is not limited in this regard, that is, with respect to the colors of light emitted by the nanocrystals 140 and the light sources 142 of the light emitters 14.

Moreover, in the embodiment, the first extension portions 102 of the light guide plate 10 are substantially perpendicular to the sidewall of the main body 100, so as to limit movement of the wavelength converter 12 along a first direction A1 parallel to the sidewall of the main body 100. The second extension portions 104 of the light guide plate 10 are substantially parallel to the sidewall of the main body 100, so as to limit movement of the wavelength converter 12 along a second direction A2 perpendicular to the sidewall of the main body 100. In addition, the light emitters 14 are aligned with the second extension portion 104 of the light guide plate 10 along the first direction A1 parallel to the sidewall of the main body 100.

As shown in FIG. 1 and FIG. 2, not only can the second extension portion 104 of the light guide plate 10 limit movement of the wavelength converter 12 along the second direction A2, but spaces between the wavelength converter 12 and each of the main body 100 and the second extension portions 104 of the light guide plate 10 can accommodate the adhesive 2 for adhering the wavelength converter 12 and the main body 100, so as to prevent the adhesive 2 from overflowing onto the upper surface and the lower surface of the light guide plate 10.

In another embodiment, the first direction A1 along which the first extension portions 102 limit movement of the wavelength converter 12 and the second direction A2 along which the second extension portions 104 limit movement of the wavelength converter 12 are not perpendicular to each other, and it is necessary only that the first extension portions 102 and the second extension portions 104 can achieve the purpose of limiting movement of the wavelength converter 12 on a plane that is parallel to the light guide plate 10.

Furthermore, the reflector 16 of the backlight module 1 is disposed under the light guide plate 10 for limiting movement of the wavelength converter 12 along a third direction A3 perpendicular to the reflector 16, as shown in FIG. 2. In the embodiment, the reflector 16 under the main body 100 of the light guide plate 10 partially extends under the second extension portions 104 after extending under the first extension portions 102, but the invention is not limited in this regard. In another embodiment, the reflector 16 under the main body 100 of the light guide plate 10 can also entirely extend under the second extension portions 104 after extending under the first extension portions 102, or can just partially extend under the first extension portions 102 and not under the second extension portions 104, and it is necessary only that the purpose of limiting movement of the wavelength converter 12 along the third direction A3 perpendicular to the reflector 16 can be achieved.

Figure 3:
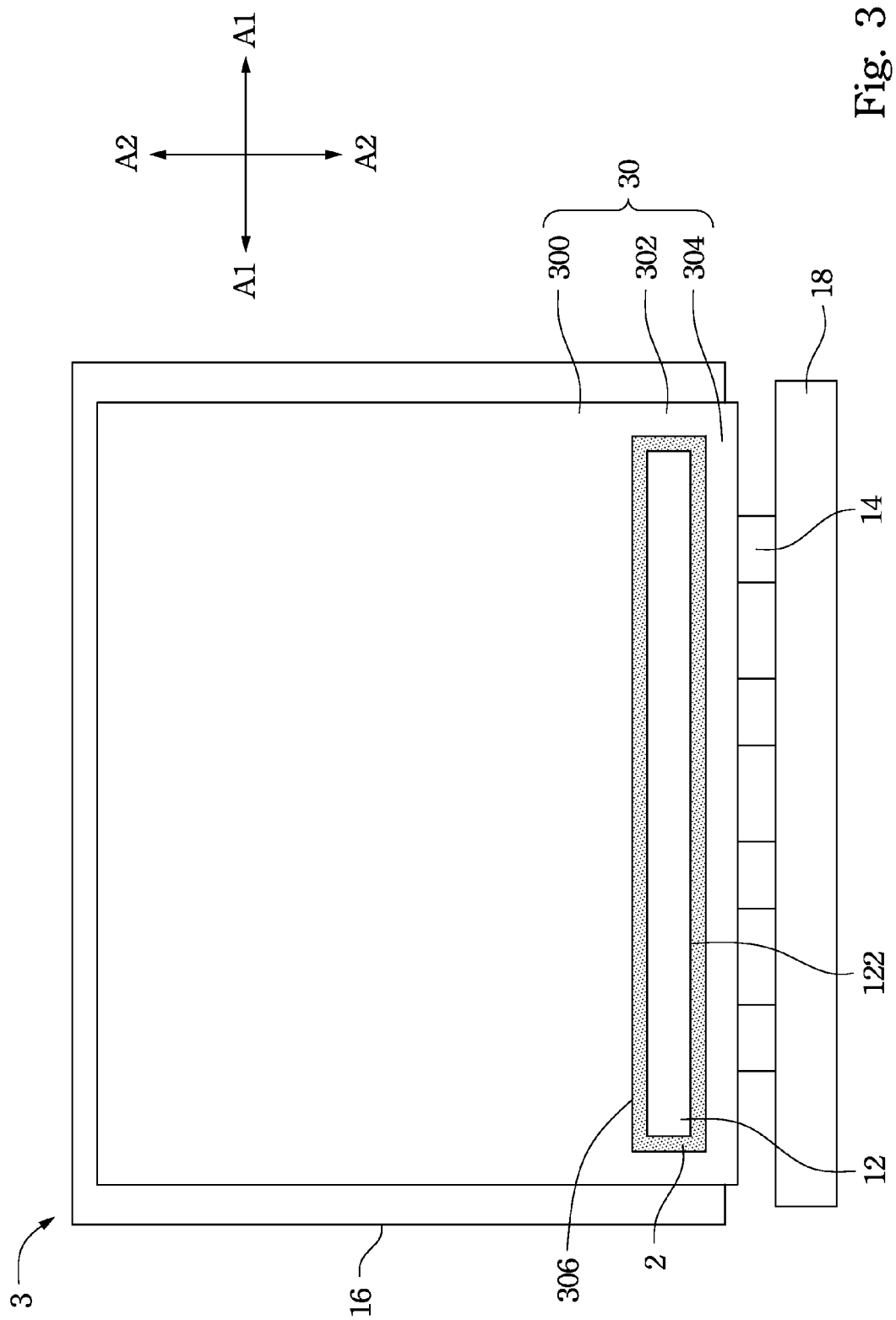
FIG. 3 is a top view of a backlight module according to another embodiment of the invention.

FIG. 3 is a top view of a backlight module 3 according to another embodiment of the invention.

As shown in FIG. 3, the backlight module 3 includes a light guide plate 30, a wavelength converter 12, light emitters 14, a reflector 16, and a circuit board 18. However, compared to the light guide plate 10 of the embodiment in FIG. 1 and FIG. 2, a second extension portion 304 of the light guide plate 30 extends between the light emitters 14 and the wavelength converter 12, and each of the light emitters 14 and the light guide plate 30 are connected to each other by an engaging, adhering, or other similar mechanism. In other words, the light emitters 14 of the backlight module 3 abut against the second extension portion 304 of the light guide plate 30 rather than the incident surface 122 of the wavelength converter 12, and emit light into the incident surface 122 of the wavelength converter 12 through the second extension portion 304. That is, the light emitters 14 of the backlight module 3 are not aligned with the second extension portion 304 of the light guide plate 3 along the first direction A1 parallel to the sidewall of a main body 300 of the light guide plate 3.

Moreover, in the embodiment, the main body 300, first extension portions 302, and the second extension portion 304 of the light guide plate 3 form a circular inner wall 306. The wavelength converter 12 of the backlight module 3 is located within the circular inner wall 306. Therefore, the wavelength converter 12 can be adhered within the circular inner wall 306 and on the reflector 16 by the adhesive 2.

As shown in FIG. 3, not only can the first extension portions 302 and the second extension portion 304 of the light guide plate 30 limit movement of the wavelength converter 12 along both the first direction A1 and the second direction A2, but spaces between the wavelength converter 12 and each of the main body 300, the first extension portions 302, and the second extension portion 304 of the light guide plate 30 can accommodate the adhesive 2 for adhering the wavelength converter 12 within the circular inner wall 306, so as to prevent the adhesive 2 from overflowing onto the upper surface and the lower surface of the light guide plate 30.

Figure 4:
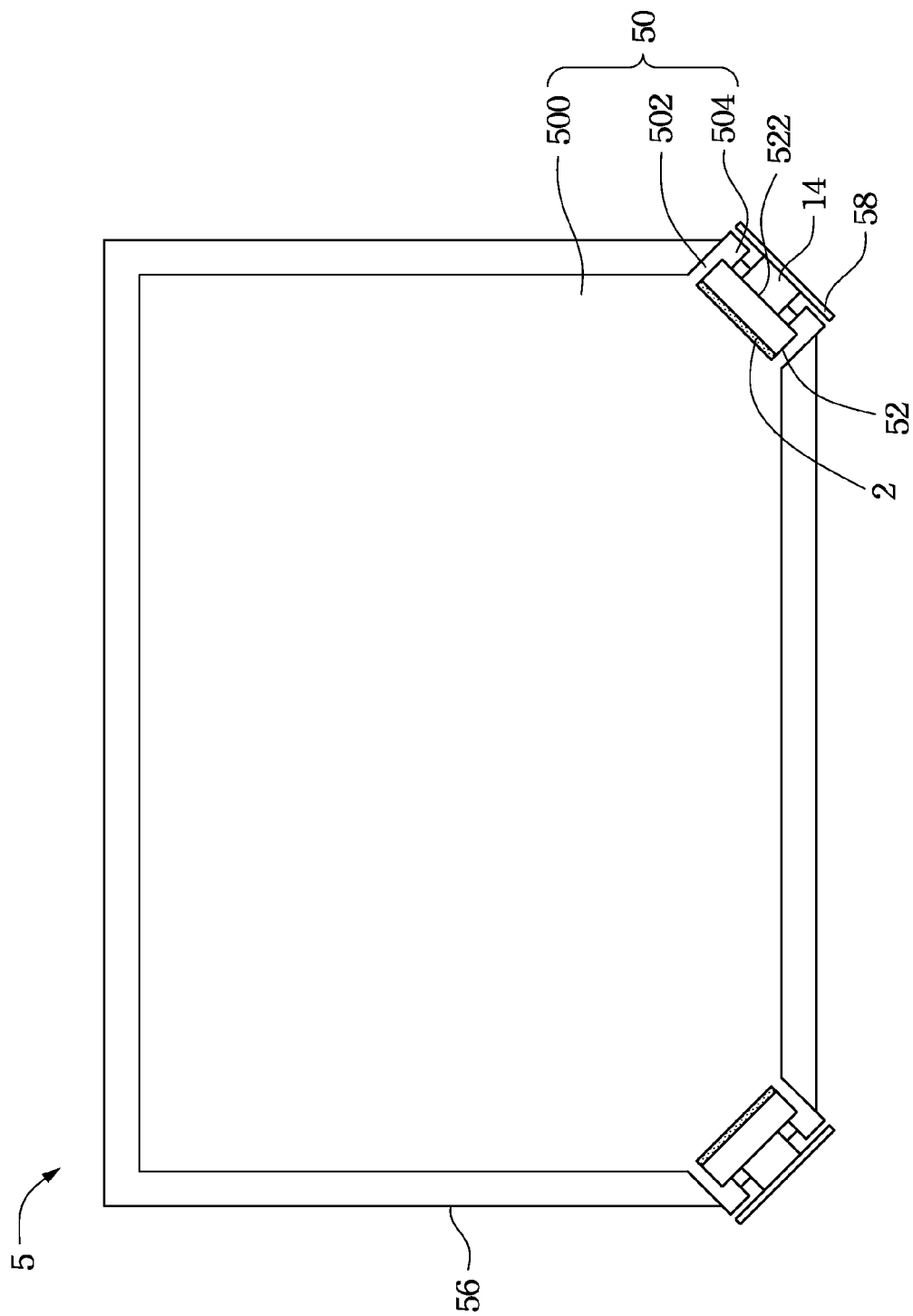
FIG. 4 is a top view of a backlight module according to another embodiment of the invention.

FIG. 4 is a top view of a backlight module 5 according to another embodiment of the invention.

As shown in FIG. 4, the backlight module 5 includes a light guide plate 50, wavelength converters 52, light emitters 14, a reflector 56, and circuit boards 58. However, compared to the light guide plate 10 of the embodiment in FIG. 1 and FIG. 2, an assembly of a pair of first extension portions 502 and a pair of second extension portions 504 of the light guide plate 50 is disposed at each of the bottom-left corner and the bottom-right corner of a main body 500 of the light guide plate 50. Therefore, compared with the embodiment in FIG. 1 and FIG. 2, the wavelength converters 52 and the circuit boards 58 electrically connected to the light emitters 14 of the backlight module 5 can be shorter. Because both of incident surfaces 522 of the wavelength converters 52 are shorter, the quantity of the light emitters 14 used in the backlight module 5 can be reduced. By enabling the light emitters 14 disposed at the bottom-left corner and the bottom-right corner of the light guide plate 50 to emit light toward the center of the light guide plate 50, and through use of a reflector 56 that is optically designed to reflect the light, the backlight module 5 can generate uniform planar light.

Figure 5:
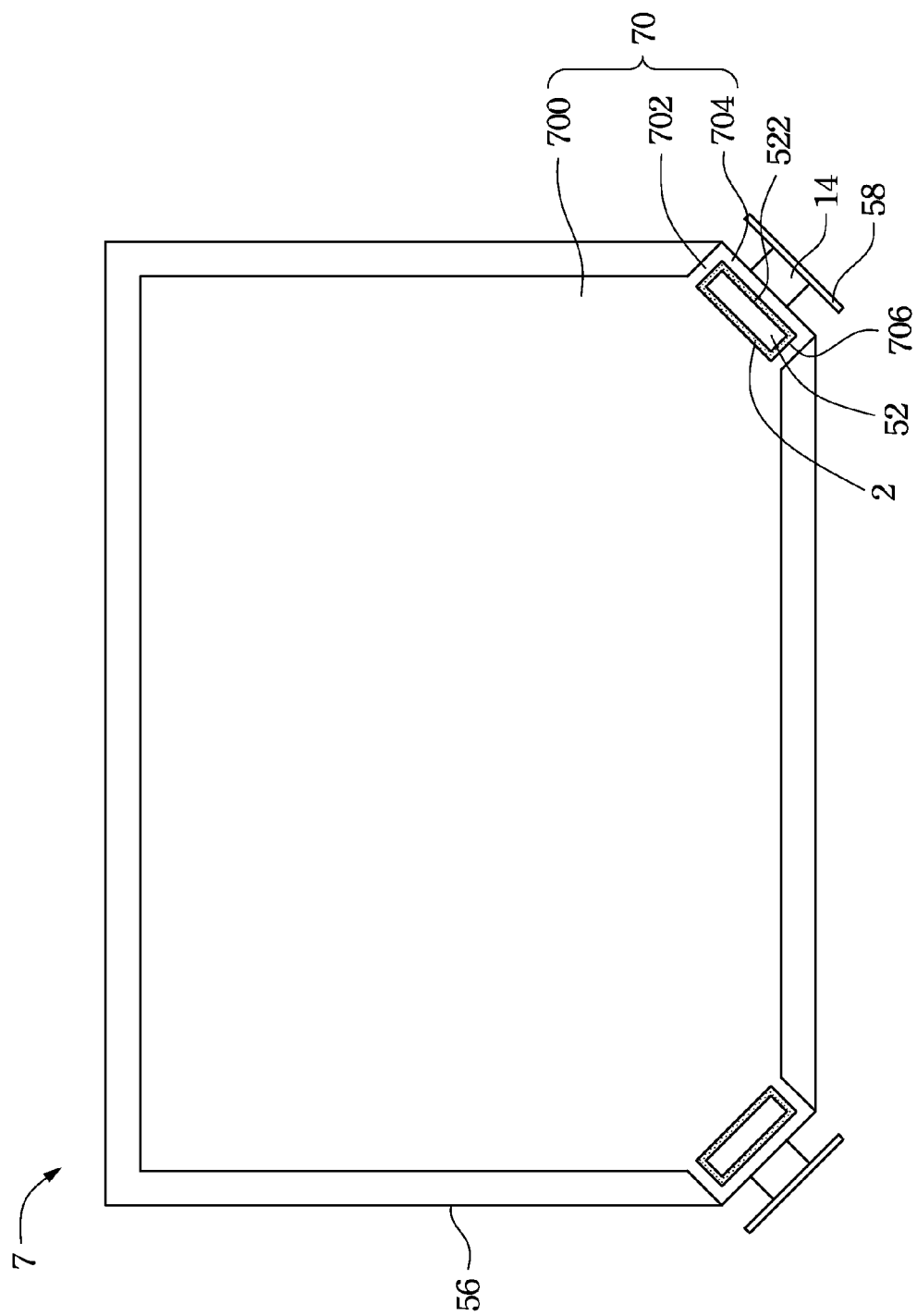
FIG. 5 is a top view of a backlight module according to another embodiment of the invention.

FIG. 5 is a top view of a backlight module 7 according to another embodiment of the invention.

As shown in FIG. 5, the backlight module 7 includes a light guide plate 70, wavelength converters 52, light emitters 14, a reflector 56, and circuit boards 58. However, compared to the light guide plate 30 of the embodiment in FIG. 3, an assembly of a pair of first extensions 502 and a second extension portion 504 of the light guide plate 50 is disposed at each of the bottom-left corner and the bottom-right corner of a main body 500 of the light guide plate 50. That is, two circular inner walls 706 are respectively formed at the bottom-left corner and the bottom-right corner of the light guide plate 50. Therefore, compared with the embodiment in FIG. 3, the backlight module 7 can use the wavelength converters 52 and the circuit boards 58 that are shorter, as in the case of the embodiment shown in FIG. 4. Because both of incident surfaces 522 of the wavelength converters 52 are shorter, the quantity of the light emitters 14 used in the backlight module 7 can be reduced. By enabling the light emitters 14 disposed at the bottom-left corner and the bottom-right corner of the light guide plate 70 to emit light toward the center of the light guide plate 70, and through use of a reflector 56 that is optically designed to reflect the light, the backlight module 7 can generate uniform planar light.

According to the foregoing recitations of the embodiments of the invention, it can be seen that a first extension portion and a second extension portion that are particularly designed are formed on a sidewall of a light guide plate of the backlight module. A wavelength converter of the backlight module can abut against the first extension portion and the second extension portion of the light guide plate and thus is limited in movement in directions parallel to the light guide plate. Therefore, a light emitter and the wavelength converter of the backlight module can be connected to each other without the use of an adhesive (e.g., a LOCA) to thereby solve the problem of overflowing of the adhesive. In addition, when the wavelength converter is adhered to a main body of the light guide plate, a LOCA is applied between the wavelength converter and the first extension portion and simultaneously between the wavelength converter and the second extension portion, so as to further enhance the mounting strength between the wavelength converter and the light guide plate. Furthermore, not only can the second extension portion of the light guide plate limit movement of the wavelength converter, but spaces between the wavelength converter and each of the main body and the second extension portion of the light guide plate can accommodate the LOCA for adhering the wavelength converter and the main body, so as to prevent the LOCA from overflowing onto the upper surface and the lower surface of the light guide plate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module comprising:
   a light guide plate comprising:
      a main body;
      a first extension portion connected to the main body; and
      a second extension portion connected to the first extension portion;
   a wavelength converter disposed at a side of the main body, the wavelength converter having an incident surface facing away from the main to body, the first extension portion abutting against a sidewall of the wavelength converter, the second extension portion abutting against the incident surface; and
   a light emitter disposed at a side of the light guide plate.

2. The backlight module of claim 1, wherein the first extension portion is substantially perpendicular to a sidewall of the main body, so as to limit movement of the wavelength converter along a first direction parallel to the sidewall of the main body, and the second extension portion is substantially parallel to the sidewall of the main body, so as to limit movement of the wavelength converter along a second direction perpendicular to the sidewall of the main body.

3. The backlight module of claim 2, further comprising a reflector, disposed under the light guide plate, for limiting movement of the wavelength converter along a third direction perpendicular to the reflector.

4. The backlight module of claim 1, further comprising an adhesive applied between the main body and the wavelength converter.

5. The backlight module of claim 4, wherein the light emitter abuts against the incident surface.

6. The backlight module of claim 5, wherein the light emitter is aligned with the second extension portion along a first direction parallel to a sidewall of to the main body.

7. The backlight module of claim 5, further comprising a circuit board, wherein the light emitter is disposed on the circuit board, and the second extension portion and the circuit board are connected to each other.

8. The backlight module of claim 1, wherein the second extension portion extends between the light emitter and the wavelength converter, and the light emitter and the second extension portion are connected to each other.

9. The backlight module of claim 8, wherein the light emitter is not aligned with the second extension portion along a first direction parallel to a sidewall of the main body.

10. The backlight module of claim 8, wherein the main body, a pair of the first extension portions, and the second extension portion form a circular inner wall, and the wavelength converter is located within the circular inner wall.

11. The backlight module of claim 10, further comprising an adhesive applied between the wavelength converter and the circular inner wall.

12. The backlight module of claim 1, wherein the first extension portion and the second extension portion that are connected to each other substantially to form an L-shaped configuration.

13. The backlight module of claim 1, wherein the first extension portion and the second extension portion are located at a corner of the main body.

14. The backlight module of claim 1, wherein a wavelength converting material is packaged in the wavelength converter, and the wavelength converting material has nanocrystals included therein.

* * * * *